G. D. HOLSMAN & J. L. RISHE.
TROUSERS FASTENER.
APPLICATION FILED JUNE 6, 1914.

1,146,878.

Patented July 20, 1915.

Witnesses:
Lee J. Pitner
E. V. Gustafson

Inventors,
Gus David Holsman,
John L. Rishe,
By Glenn D. Noble Att'y.

UNITED STATES PATENT OFFICE.

GUS DAVID HOLSMAN AND JOHN L. RISHE, OF CHICAGO, ILLINOIS.

TROUSERS-FASTENER.

1,146,878.

Specification of Letters Patent.

Patented July 20, 1915.

Application filed June 6, 1914. Serial No. 843,373.

*To all whom it may concern:*

Be it known that we, GUS DAVID HOLSMAN and JOHN L. RISHE, citizens of the United States, and residents of Chicago, in the county of Cook and State of Illinois, have invented certain new and useful Improvements in Trousers-Fasteners, of which the following is a specification.

This invention relates more particularly to means for fastening the trousers, which will also serve for adjusting the size of the trousers band.

Among the objects of this invention are to provide a simple and efficient trousers fastener which may be easily and economically made; to provide a fastener which will permit a given amount of adjustment of the trousers band; to provide a fastener having means for securely locking the two portions together to prevent relative movement thereof; and in general, to provide such an improved form of fastener as will be more fully described hereinafter.

Figure 1:
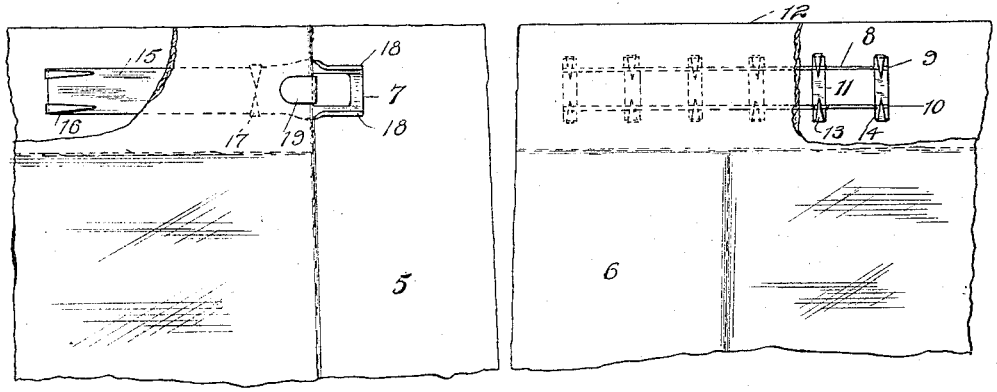
Figure 2:
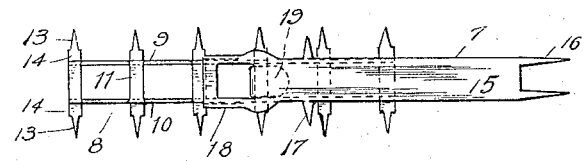
Figure 3:
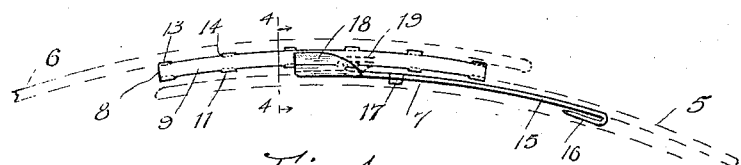
Figure 4:
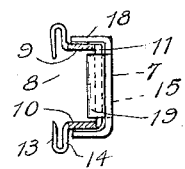

In the accompanying drawings illustrating our invention: Figure 1 is a front view of the upper portion of the trousers, shown slightly separated, with our improved fastener in position, parts being broken away for convenience in illustration; Fig. 2 is an inner view of the fastener showing the parts engaged; Fig. 3 is a top view of the fastener with the trousers flaps indicated in dotted lines; and Fig. 4 is a sectional view taken on the line 4—4 of Fig. 3.

Our improved fastener is intended to take the place of the ordinary hooks or buttons commonly used for fastening the bands of trousers at the front, and is arranged and constructed so as to permit a desired amount of adjustment of the band.

As indicated in the drawings, 5 and 6 represent the inner and outer flaps of the trousers. The inner flap is provided with a hook member 7 while the outer flap is provided with a co-acting fastening member 8, having a plurality of engaging portions for the hook member 7. As above stated, one of the principal objects of our invention is to construct the fastener so that the hook portion and the co-acting portion will be firmly locked together so as to substantially prevent any relative movement between these parts after they have been brought into engagement. In order to accomplish this object the engaging member 8 is made comparatively stiff or rigid, and the hook member 7 is also made stiff or rigid and provided with means for locking engagement with the member 8 so as to hold them in relatively fixed relation when fastened. In order to make the locking member 8 comparatively light as well as rigid, it is made in the form of a channel, with sides 9 and 10 which are preferably curved to conform to the general contour of a person, as indicated in Fig. 3. These sides or flanges are connected by cross pieces 11, preferably formed integrally therewith, and spaced at such distances apart as to provide for the desired adjustment of the fastener. This channel member may be fastened to the trousers band 12 in any desired manner, but is preferably provided with a plurality of tangs or sharpened tongues 13 for securing it to the band. These tangs are made integral with the channel member, and short lateral projections 14 are provided at the bases of these tangs so that they may have something to fold back upon in order to make a locking engagement with the goods. The fastening member 8 may be secured to such portion of the band as desired, but is preferably arranged on the inside adjacent to the edge of the front flap with the fastening tangs or tongues extending in the band.

The hook member 7 comprises a plate or strip 15 with tangs or tongues 16 at one end thereof and tangs 17 at the sides thereof for engagement with the goods. The tangs 16 are in alinement with the strip in order to provide for the longitudinal pull on this member, while the tangs 17 hold it in vertical position with respect to the trousers flap 5. These tangs preferably engage with the lining portion of the band and do not extend out through the goods. The main portion of the bar or strip 15 lies between the outer and inner portions of the band, but one end projects outwardly as shown in Fig. 1, this end being provided with short flanges 18, thereby making the end of channel like form. A hook 19 is also provided at this projecting end, this hook being preferably formed integrally with the main strip by forming a tongue and bending it back as indicated. When in fastening position, the hook 19 engages with one of the cross bars 11, and the flanges 18 fit closely over the sides of the flanges 9 and 10. When in this position the hook being at some distance from the outwardly projecting end will lock the part so that there will be no lateral movement between the members 7 and 8, such locking arrangement being clearly indicated in Figs. 2–4. The hook 19 is also fitted closely between the flanges 9 and 10, while the flanges 18 fit closely against the outer faces of these flanges so that the parts 7 and 8 are locked against relative vertical movement. The strip or bar 15 is preferably curved to conform substantially with the curvature of the member 8, as indicated in Fig. 3. This substantially absolute locking of the parts is highly desirable or necessary in order to prevent the gaping of the flaps when the fastener is hooked for different adjustments, and more particularly when the hook 19 is engaged with one of the bars farthest to the right, as indicated in Fig. 1, so as to take up the trousers band to the fullest extent, as at such time there will be a considerable overlapping of the flaps. The bar 11 at the extreme right end, as shown in this figure will ordinarily not be used as, if the hook were in engagement with this cross piece, there would be nothing for the flanges 18 to engage with. The buttons are arranged for the fastener with the hook in engagement with one of the central cross bars so that the band may be either tightened or loosened without disturbing the buttons, there ordinarily being opportunity for a considerable amount of adjustment in such cases.

Our improved fastener provides means whereby ready made trousers may be conveniently adjusted to fit different sized persons, and it also provides means whereby the wearer may readily adjust the trousers band for comfort or convenience and may keep the band relatively tight or loose as desired without liability of the gaping of the flaps.

As will be readily seen, our improved device may be stamped from suitable metal and may be quickly applied to the trousers, and when in position will form an efficient and satisfactory fastener which is capable of any desired amount of adjustment. It will also be noted that changes in the details of construction of this invention may be readily made without departing from the scope of our invention, and therefore we do not wish to limit ourselves to the exact form of construction shown, except as specified in the following claims, in which—

We claim:

1. In an adjustable trousers fastener, the combination of a substantially non-yielding fastening member adapted to be securely fastened to one end of the trousers band, and having a plurality of longitudinally spaced hook engaging portions, and a second fastening member of substantially the same length as the first-named member, said second-named member having a portion which is adapted to be secured to the opposite end of the band, and having a channel shaped portion at the end thereof, and also having a hook spaced backwardly from the channel shaped end and adapted to engage with the co-acting portions of the first-named member, the channel shaped end of the last-named member being adapted to fit over the sides of the first-named member when the hook is in engagement to hold the two members in alinement and press them toward each other.

2. In a device of the character set forth, the combination of a fastening member having cross pieces for engagement with a hook, and a second fastening member of substantially the same length as the first-named member, said second-named member having a hook spaced backwardly from the outer end for engagement with the cross pieces of the first-named member, and having projections at the outer end for engagement with the sides of the first-named member, whereby the two members will be held against relative lateral or swinging movement when the hook is engaged with one of the cross bars.

3. A trousers fastener, comprising a channel shaped fastening member with a plurality of cross bars for engagement by a hook, means for fastening said member to the trousers, and a co-acting member of substantially the same length as the first member comprising a strip of metal having a hook spaced a short distance from one end for engagement with said cross bars and having a channel section from the hook to the adjacent end fitting over the first named member and serving to lock the parts in position, and means for fastening said second named member to the trousers.

GUS DAVID HOLSMAN.
JOHN L. RISHE.

Witnesses:
LEE J. PITNER,
E. V. GUSTAFSON.

Copies of this patent may be obtained for five cents each, by addressing the "Commissioner of Patents, Washington, D. C."